Aug. 8, 1939. H. J. KUHLMAN 2,169,070
CORN HARVESTER
Filed Aug. 28, 1936 2 Sheets-Sheet 1
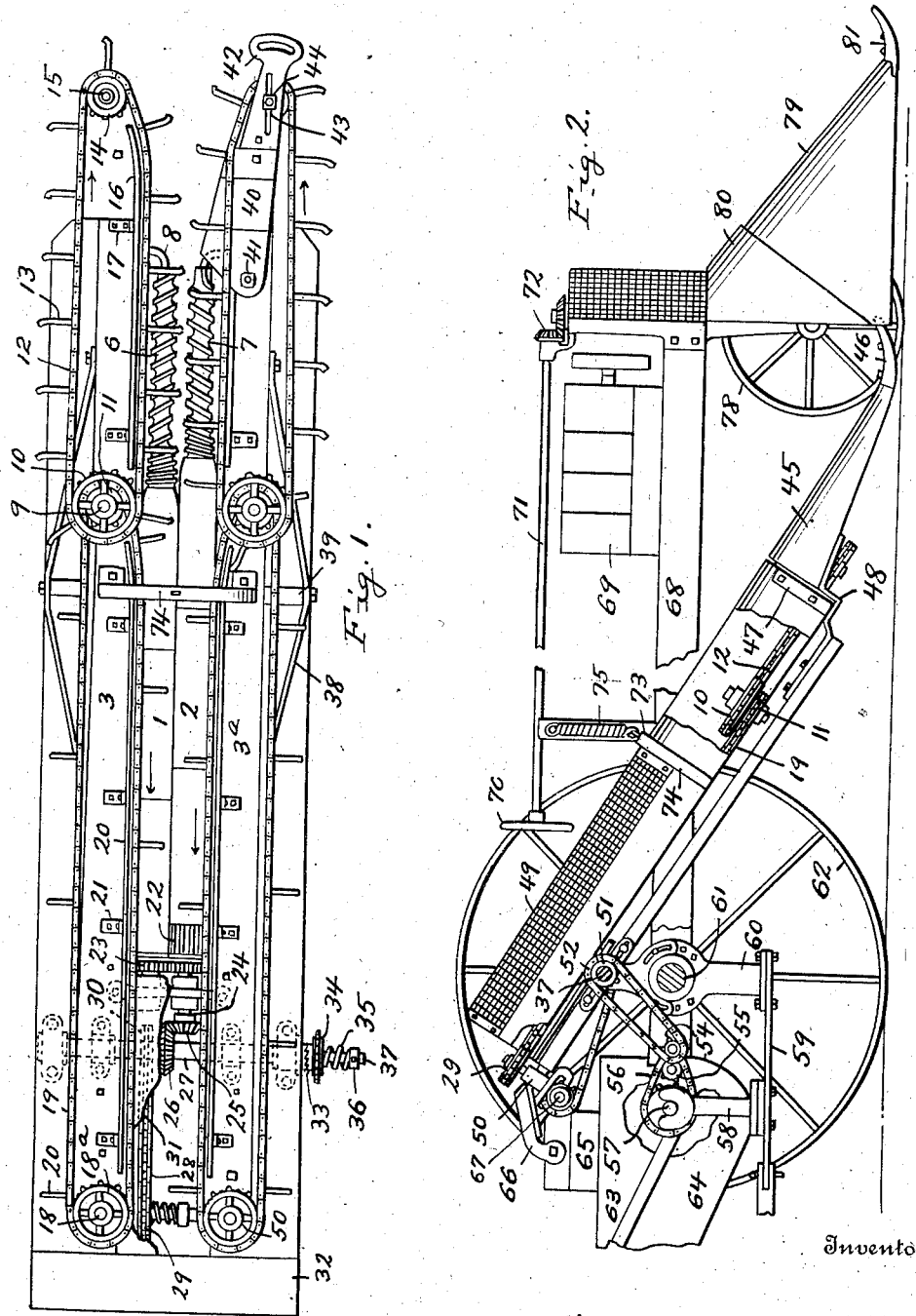
Inventor
Henry J. Kuhlman
By G. C. Kennedy
Attorney

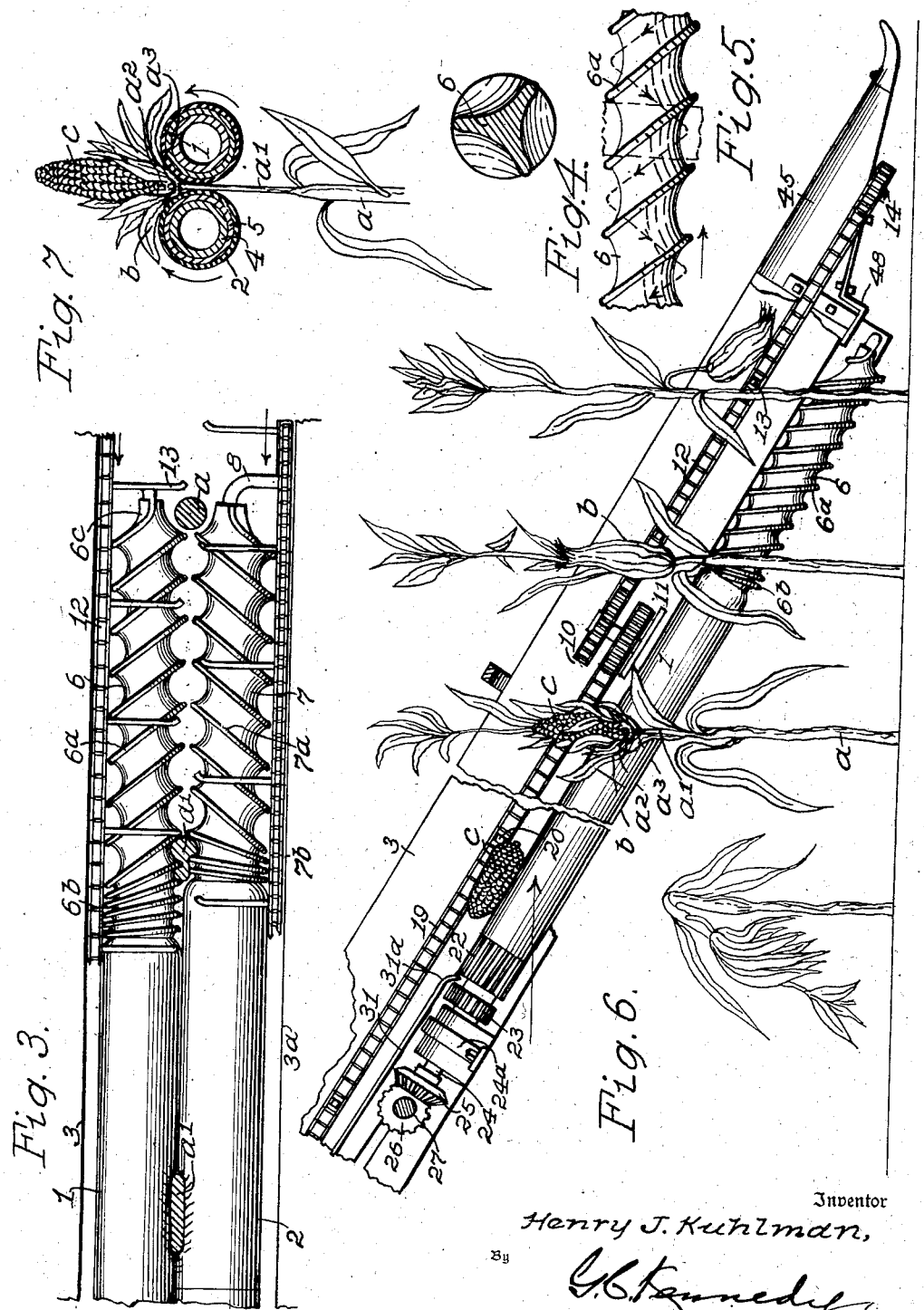

Patented Aug. 8, 1939

2,169,070

UNITED STATES PATENT OFFICE 2,169,070

CORN HARVESTER

Henry J. Kuhlman, Waterloo, Iowa, assignor to Kuhlman Manufacturing Company, Waterloo, Iowa, a corporation of Iowa Application August 28, 1936, Serial No. 98,305

4 Claims. (Cl. 130—5)

My invention relates to improvements in corn harvesters, and a prime object of my improvements is to provide in a machine of this class, coacting related means for gathering corn stalks planted in a row into alinement for separated treatments, then acting particularly upon their ears in succession and separately to practically simultaneously strip their husks downwardly while separating their ears at the same time from their stems within the downwardly moving husks, delivering the ears free from their husks lengthwise and carrying them hence along and to a place of delivery.

A special feature of said improvements is to combine in coacting operation with a pair of stripping and snapping rolls, means for gathering and alining the stalks in a row within the machine for delivery to ear stripping and snapping delivery rolls in treating the ears separately and in succession as stated, and in associating with said gathering means and rolls an auxiliary means for transporting and alining stripped snapped ears to a place of delivery, such as a following vehicle or otherwise.

Another special feature of this invention is to provide the rolls with triple spiral threads so spaced and relatively located that each alined stalk can be treated singly during the forward progress of the machine along a row, while the rotary speed of the rolls is properly coordinated to the longitudinal forward movement of the machine, which causes the stalk to be kept upright while under treatment in all of its stages up to and until the machine has released the stripped and treated stalk and its ears.

Another special feature is the arrangement and construction and relative positioning of the rolls, which permits them to act upon the alined stalks and then upon the ears in a manner to prepare the ears for being husked while simultaneously snapped for delivery to the rear.

Another object of my improvements is to furnish a pair of rolls of a peculiar and efficient construction and coaction which will permit them to reliably guide the alined stalks therebetween while grasping them effectively as also their ears in a manner closely resembling hand stripping of the husks from the stalks and at the same time snapping and separating the ears from the husks by rupture of their stems from the husks and entirely within the husks while the grasped husks are being withdrawn downwardly between the rolls while the ears so released are kept above and on the valley of the rolls lengthwise to be then transported by auxiliary mechanism to the rear part of the machine for delivery there as entirely stripped of husks, in alined succession, and without the need for other or auxiliary special mechanisms for thereafter husking or otherwise treating the already husked ears.

Another object of my improvements is to supply adjustable carrying structures for the above mentioned mechanisms, including ways or ramps suitable for the placing of the husked ears therealong and toward a place of deposit, together with suitable mechanisms coacting in moving the rolls relatively to each other and in associatively guiding the stalks being treated and the ears under said operations toward the place of deposit.

Other improvements will be hereinafter particularly adverted to, and described as to their related functions.

It is to be understood, that various alterations or substitutions may be effected in any or all of said structures and mechanisms, without thereby departing from this invention or from the meaning, purposes and scope of the appended claims.

In the drawings, Fig. 1 is a top plan of the said coacting mechanisms of my machine, aside from means for forward propulsion thereof and for driving said mechanisms. Fig. 2 is a side elevation thereof, including tractor means and driving connections. Fig. 3 is an enlarged detail plan of the forward parts of the rolls, with parts broken away, and Fig. 5 is a fragmentary view of the spiralled front part of one roll. Fig. 4 is a cross section of the spirally threaded part of one roll. Figs. 6 and 7 are diagrammatic views showing the means for performing the above operations.

In the state of this art, it is well known that no corn harvester has yet been invented or patented which comprises in its associated mechanisms and other structures means which coact in due and alined succession and by simple coordinated elements which aline and separately treat stalks in a row while the machine is moving therealong, and whereby certain elements successfully coact in immediately treating successive ears as the machine proceeds, in acting thereupon, in an elastic grasping manner to strip and remove the husks from an ear while positioning the treated ear suitably for delivery to the rear of the machine and whereby the husks are withdrawn from the ear by snapping of the stem of the ear within the basal part of the enwrapped husks, so that no further or other treatment is necessary upon the husked ear as thus snapped, while being unwrapped from the husks and delivered rearwardly during the progressive forward movement of the machine. My invention has been successfully reduced to practice in all such particulars.

It will be understood, that any suitable means of transporting the machine to and fro may be used other than those shown herein, and also that the details of the rolls and their coordinated respective stalk and ear treating means may be varied while remaining within my invention.

Referring first to Figs. 1 and 2, the numeral 68 denotes the frame structure of a tractor, with its engine 69, and having directive means for a removable prow 79 thereon, consisting of a shaft 71 with hand-wheel 70, gearing 72 for swinging the forward wheels 78 to and fro, the prow having a forward upwardly curved finger 81 as is usual in said machines. Upon a rigid post 73 on the tractor frame 68 is suspended a coiled spring 75 which is connected to an arch 74 with side members secured rigidly to side frame parts of the harvester proper.

The rear part of the tractor has power-driven rear wheels 62 with axle 61. On the axle is supported adjustably upon the frame 68 a casting 60 having a standard mounted adjustably upon its upper part containing a bearing seat for a rotary shaft 37 which traverses a frame hanger of a corn harvester frame adjustably, and this shaft 37 is driven by the engine 69 of the tractor 68 by means not shown. The shaft 37 is also mounted in bearings on the basal part of the harvester as indicated by the dotted lines thereof in Fig. 1. On the shaft 37 is a sprocket-wheel not shown and a like sprocket-wheel 51 on its hither side, the first-mentioned carrying a sprocket-chain which is passed around a sprocket-wheel on a shaft 67 mounted adjustably in bearings in brackets 66 which carry a hopper 65 to the rear of and below the rear of the apron 32, which is inclined toward it, and serving to deliver husked ears of corn to the hopper and into an upwardly inclined longitudinally directed chute 64 having side walls as at 63, and which as usual contains propelling means therein to propel the ears to the rear elevated end of the chute to be delivered into a following truck, see Fig. 2. The outer sprocket-wheel 51 on the shaft 37 carries a chain 52 which is also carried around a sprocket-wheel 54 on a shaft driven by said engine by means not shown, and on this latter shaft is also mounted a gear-wheel not shown which meshes with a like gear-wheel on another stub-shaft on the tractor frame, which latter stub-shaft carries a sprocket-wheel 55. The latter carries the forward end part of a chain 56 which drives a sprocket-wheel on a transverse shaft 57 extending through the elevator body 64, the shaft 57 being removably supported in bearings in the upper ends of standards 58 on the rear parts of horizontal brackets 59 fixed on the lower ends of the hanger-parts 60. This arrangement of gearing and sprocket-wheels is contrived to drive the shaft 57 with its upper ear-propelling reach movable rearwardly, by reversing the direction of drive from the shaft 37. The frame members of the harvester body at the sides 3 are mounted pivotally on said shaft 37 at a short distance forward of the rear end of the frame, permitting the frame 3 in front to be tilted adjustably up or down to a desired extent. It will be seen that the frame is resiliently suspended in advance of the shaft 37 by the spring 75 connected between the standard 73 on the tractor frame 68 and the arched member 74 which crosses the harvester body 3 transversely and rigidly. This feature is to be shown and claimed in a companion application for patent to be filed.

The forward end of the body 3 is inclined downwardly and terminates in a prow or fender 45 which is somewhat similar in its construction to the fender or prow 79 on the forward end of the tractor, the latter prow having a fixed cover 80 at its top into which the prow 79 may be tiltably adjusted and held by means not shown when desired, as in traversing uneven road-beds.

The prow or fender 45 has a terminal forward upcurved finger 46, and both fingers 81 and 46 are useful in overriding small obstacles in the way. The fender 45 may be adjustably mounted on either or both of the forward side frames of the harvester, Fig. 1 showing on one a swingably adjustable plate 40 pivoted at 41 to the frame, and at its forward end upon which the fender is mounted an adjustable connection in a slot 43 in the plate with a bolt 44 is shown to hold the prow part at 42 swingably movable from side to side as necessary in the use of the prow in the primary gathering of fallen or lodged corn stalks at one side.

Referring again to said Fig. 1, the numerals 1 and 2 denote rolls mounted in juxtaposition along the medial longitudinal line of the harvester frame or body 3, and over a separation space between its side parts. The forward end of the roll 2 extends a short distance forward of the forward end of the other roll 1, but said rolls have spirally threaded forward extensions 6 and 7 respectively, whose conically diminished forward ends 6c are hollowed to loosely seat therein the rearwardly bent arms 8 fixed on the frame.

The forward parts 6 and 7 of the rolls 1 and 2 terminate at their forward ends 6c in the same transverse line. Referring to Figs. 3, 4 and 5, it will be seen in the cross section of Fig. 4, that both rolls 6 and 7 have a like cross section, but reversed relatively to each other as shown in Fig. 3, as to their like but reversed spiral threads 6a and 7a separated by relatively wide concavities. As shown in Fig. 7, the rolls 1 and 2 turn upwardly and inwardly toward each other as indicated by the arrows. This arrangement of the forward parts of the threads permits a wide inclination thereof rearwardly as shown in Fig. 4, and these parts of the rolls are thus designed to allow a stalk of corn as shown at a in Fig. 3 to be held upright while the harvester and tractor are traveling ahead as the rolls are geared together at their rear ends to permit them to make each a single rotation of their triple threads while the tractor is traveling forward a related scientifically computed distance. The result of this is the permitting of the harvester rolls rotating in a manner and at a determined relative speed to the speed of the machine ahead, that when the rolls have arrived at a stalk a as shown in Fig. 3 they are in relative positions to allow the hollows of the rolls which are opposite each other to receive between them the stalk a, and this related speed of rotation and movement forward of the harvester rolls is such that the stalk a is usually touched by either or both of the rotating rolls while the harvester is forging ahead, but the stalk is prevented from tilting in any direction away from the vertical and is thus ready to be acted upon by the rear parts of the threads on the rolls in this position and spaced more nearly together in their interspaces as shown at 6b and 7b, where the angles of the threads are greater. These rear thread parts 6b and 7b as shown in Fig. 3, are so placed that there are fewer turns to the thread parts 7b than those of the parts 6b, and the thread parts 7b are with fewer turns and for the most part in advance of the threads 6b. This arrangement of the threads at 6b and 7b results in contracting the interspace between these threads on said rolls especially at the offset forward part of the bodies of the rolls 1 and 2.

Referring to Fig. 7, which is a transverse section of the rolls 1 and 2, both rolls are of the same construction, to the rear of the spirally threaded parts 6 and 7. The rolls 1 and 2 are of the same diameter, the roll 2 being longer, and each roll comprises a tubular core 4 within a steel sleeve 5, the latter having cemented thereon a resilient or elastically compressible sectional rubber covering, but the rear end part of the roll 2 is not covered elastically, but the inner sleeve 5 has striations 22 therealong (see Fig. 6) for a purpose to be disclosed. The hollows of the rear ends of both rolls are plugged with projecting parts carrying meshing spur-gears 23 with supporting bearings at 24a, one only of the parts or stems 24 carrying at its rear end a bevel gear 25 meshing with another bevel gear 26 on said shaft 37. The shaft 37 at its outer end has a clutch-connection 33 with its loose sprocket-wheel 34 which is kept in engagement yieldably with the clutch by a spring 35 engaging an end stop ring 36 on the shaft.

Alongside the inner reaches of side sprocket-chains 12 which move rearwardly, are the spiraled members 6 and 7 of the rolls 1 and 2 respectively. The forward parts of these chains are around like small sprocket-wheels 14 on fixed studs 15 on the forward ends of the frame 3, and their rear parts are round and driven by upper and larger sprocket-wheels 10 mounted on rotary spindles 9 on whose lower parts are fixed to also rotate therewith smaller sprocket-wheels 11. These sprockets 11 carry the forward ends of other like sprocket-chains 19, the rear ends of the chains 19 being mounted around rear smaller sprocket-wheels 18a fixed on vertical rotary shafts 18 rotatable in bearings 50, and driven by bevel-gearing not shown, as the various driving means referred to are not claimed specifically but are reserved for a companion application. On the shaft 27 is a sprocket-wheel 30 carrying a sprocket-chain 28 which drives the shaft 27 from the rear sprocket-wheels 29. The inner reaches of the chains 19 move rearwardly. The pairs of chains 12 and 19 have inner guide bars 16 and 20 respectively within and alongside their inner reaches to keep these reaches straight and taut while in operation and also to maintain their shape at places.

Both of the forward pair of chains 12 have spaced apart rigid fingers 13 on certain of their links and slightly terminally recurved, while both of the rear pair of chains 19 have similar rigid fingers 20 spaced more widely apart but not terminally recurved. The forward pair of chains 12 have their inner fingers 13 of their rearwardly moving reaches above and sweeping along over the spiraled roll parts 6 and 7. The fingers 20 similarly sweep over the rear rubber covered parts of the rolls 1 and 2 and also therebeyond over a bottom plate 31 whose rear end delivers husked ears c downwardly over the inclined member 32 of the plate to the hopper 65 and thence to the elevator trough 64 and its inclosed endless chain having transverse scrapers thereon as usual but not shown. The forward end of the plate 31 as shown in Fig. 6 extends forwardly over the rolls gearing and with its front margin bent downwardly at 31a between the rear ends of the rolls and said gearing pair at 23.

The power shaft 37 with connected driving connections 30, 28 and 29 heretofore described rotate the rear pair of sprocket-wheels 50 reversely, the chains 19 rotating the lower sprocket-wheels 11, and the common shaft 9 with the upper sprocket-wheels 10 and moving the forward pair of chains 12 as described. It is to be noted that the forward parts of the bodies of the spirally threaded rolls 6 and 7 are substantially cylindrically constructed, and that the shorter rear parts of these rolls are conic frusta with threads spiralled at a higher angle than the parts 6 and 7 ahead and with narrower interspaces. It should also be noted that the forward terminations of the elastic rubber covers of the rolls 1 and 2 are preferably curvately narrowed forwardly as shown in Figs. 1, 3 and 6 for a purpose to be described. The driver's seat is not shown in Fig. 2 or the other figures, but is to the rear of the hand-wheel 70, and the rear end part of the body 3 and its side walls may be covered by a wire netting 49 (Fig. 2) to prevent any husked ears from escaping or jumping out. While a one row harvester only is shown as propelled and actuated by means of the tractor 68, it is obvious that another may be likewise associated and actuated by the tractor for two rows, without departing from the invention.

Operation

When the harvester shown in Figs. 1 and 2 is moved forwardly at a predetermined rate of speed, to cause the forward fenders 45 and the forward parts of the chains 12 to straddle a row of hilled corn stalks evenly spaced as usual, as shown in Figs. 3 and 6 the roll forward spiralled members 6 and 7 receive between them an erect stalk as at a in Fig. 3, so that the opposed troughs or valleys opposite each other inclose the outer opposite sides of the stalk either in or out of direct contact therewith. It will be seen that the stalk thus assumes a vertical position in every case, and during the travel of the pair of rolls thereby throughout their extent until the rear threaded conic frusta at 6b has advanced to the stalk a. As the spiral threads 6b on these conic frusta are more closely spaced that the forward spirals and at a greater angle to the axes of the rolls respectively the further advance of the machine causes these threads 6b to seize upon opposite sides of the stalk with a crushing and flattening effect as shown at a1, deforming it as the machine further advances, and this effect is enhanced when the forwardly offset rubber covered end of the roll 2 crowds the stalk yet more compressively between the frustal threads of the roll part 6 and the rubber wall of the offset part of the roll 2 as stated, so that as the machine progresses the stalk is flattened as indicated at a1 in Fig. 3, the elastic covers of the rolls compressing and yieldably grasping the stalk and husks of an ear as shown in said figure, so that the flattened stalk a1 is in effect manipulated as if by the muscular flesh manipulation of two human hands grasping the stalk between them while the rolls move along forwardly and the inclination of the rolls mounts along the stalk.

Turning now to Fig. 6, which is of a diagrammatic character, the further progress of the rolls over and along the stalk as they mount thereaIong due to their rear upward inclination brings to the rolls the relative position to the stalk a where the rolls have climbed to engage between them the butt end of a husk covered ear b, as the rolls also seize upon the stem a3 of the ear below its husk b. It is obvious, that the ear b of the stalk a has in this forward progress of the machine been progressively lifted to an erect position as from a hanging position on the stalk in some cases, by the progressive action of the fingers 13 on the forward chains, and later by the riding of the rolls over the stalk. This action of the chains 12 and their fingers 13 terminates just before the machine has moved to actually grip the lower part of the encasing husks b of the ear c. The rear chains with their similar fingers now operate on the ears in turn as above treated and especially upon the severance of the butt of an ear c within the husks b, as also displayed in Fig. 7, where the flattening of the stalk at a1 is shown best. It is well known, that an ear of corn as incased by its husks b is supported on a short stem a3 on the stalk a, the stem a3 carrying the husks and penetrating therethrough to its connection with the base of the cob of the ear c.

The ear c having arrived at this critical position as related to the inwardly rotating rolls 1 and 2 which are because of their inclination riding upwardly along the stalk a and the ear stem a3, it is obvious that farther progress forwardly of the rolls and their inward rotation coupled by their grasping effect because of elastic compression at that location on the covers of the rolls, will cause this elastic cover to exert a creeping pull upon the basal parts of the husks, and as the relatively thick and rigid ear 6 cannot be drawn between the rolls, the stem a3 parts between the husks b and the base of the ear at a2 (Figs. 6 and 7), whereby the husks are as by the grasp of a pair of fleshy human hands pulled away from the ear downwardly and below the rolls, leaving the husked ear above and in the trough of the rolls, whence the ear is propelled up the incline of the rolls as shown at c in Fig. 6, where any fragments of undivested husks are seized by the striations 22 and the elastically yielding cover of the opposite roll, and removed. The ear is then propelled upon and along the upwardly inclined plate 31 uninterruptedly, as the forward end of the plate bent down at 31a offers no impediment there. The ear is carried by the chain fingers 20 to and delivered to the hopper 65 and elevator chute 64.

Fig. 6 shows the progressive stages of the above operation, from start to finish. An ear under treatment cannot escape from any stage of the operation, as the forward prows 45 together with the fingered chains 12 gather between them not only erect stalks, but inclined or prostrate ones, guiding them to the erect position where, as shown in Fig. 3, these mechanisms advance and treat each stalk serially without evasion, and progressively flatten a part of each stalk where it can be compressed between the yieldable elastic roll covers until the inclined rolls grasp the stalk and also strip the husks downwardly from the ear between the rolls as simultaneously the stem a3 is forced to part within the husks at a2, the ear riding up the rolls as stated as the husks disappear below.

Each of the above described new features of the machine thus contribute to the undeviating success of the gathering of the stalks, and of the snapping and husking of the ear, and its delivery to a place of deposit entirely cleaned of husks, without other or additional devices or a separate set of husking rolls. Also, the simplicity of the coacting mechanisms, and their supporting structures, not only adds to their efficiency, but omits unnecessary parts and mechanisms, with a resulting lessening of weight to be hauled, and of the cost of maintenance and repairs.

Fig. 6 displays the position of the harvester at a certain stage of its forward progress and at the instant when the rolls are operating in simultaneously snapping and husking an ear. It will be seen that the second stalk a from the right or front has its ear b, as yet unhusked, placed in an upright position ready to be husked on the farther progress of the machine. This is due to a propulsion rearwardly by a chain tooth 13 moving rearwardly. The first stalk to the front shows an unhusked ear depending to the front. Another chain tooth 13 is engaging its stalk a as the machine moves forward with its roll threads inclosing the stalk therebetween, and as the machine progresses the tooth 13 lifts the hanging ear to a raised position as in the second stalk. The further progress of the machine then causes the rolls to act on the stalk and ear as already stated, so that the driver is free to drive ahead, the machine being thus entirely automatic in its said progressive functions.

Referring again to Figs. 6 and 7, it will be seen that in sequence the stalks a are seized between the rubber covered rolls 1 and 2, and that as the machine advances the obliquity of the rolls upward and rearwardly is at an angle to each stalk and to each ear b when the ears are brought to and kept at this angle by means of the projections or fingers on the inner reaches of the traveling chains 12 in turn as they move rearwardly, whereby the ears in turn, when the rolls have reached the butt of an unhusked ear on its stem a3, the inturning elastic roll covers grasp, like an opposed pair of fleshy human hands, the attached lower ends of the husks b, thus withdrawing the husks downwardly between the rolls, and as the rounded butt of the ear in this angular position to the rolls cannot also be drawn down likewise therebetween, the stem a3 of the ear is ruptured between the butt of the ear and the attachments of the husks to the stem, the break occurring at the point a2 as shown in Fig. 6. The husks are thus delivered below the rolls with the ear wholly stripped from the husks, and the erect ear then propelled by the fingers 20, as shown in said figure at c, lengthwise in the valley of the rolls over the plate 31 and dropped into the hopper 65 over the rearwardly inclined plate end 32. This combined operation of the rolls and chain fingers in positioning the butt of each unhusked ear in the valley of the rolls causes the unfailing simultaneous withdrawing or husking of the ear husks while breaking the ear stem a2 at a3 wholly within the husks.

I claim:

1. In a corn harvester, a snapping roll having a helical groove extending rearwardly from its forward end, the rear end portion of the groove being reduced in pitch and depth, and the major and forward portion of the groove being of uniform pitch and depth.

2. In a corn harvester, a snapping roll having a helical groove extending rearwardly from its forward end, the rear end portion of the groove being continuously reduced in pitch and depth, and the major and forward portion of the groove being of uniform pitch and depth.

3. In a corn harvester, a pair of coacting oppositely rotatable gathering, snapping and husking rolls having their forward parts oppositely threaded at the same pitch for a like distance rearwardly and reversely with the rear ends of the threads offset, and the rear parts of the opposed threads progressively decreased in pitch and gradually offset relatively to each other to gradually lessen the width and the depth of their troughs, whereby alined stalks are traversed between the rolls when advancing, and gradually compressed between the rolls in a zone of both rolls where the threads are offset and then frictionally grasped movably by the rolls and therebetween, to engage the butts of ears on the stalks, sever the stems of the ears within the husks and expel the ears from the husks while the husks are being withdrawn between the rolls.

4. In a corn harvester, a pair of coacting oppositely rotatable gathering, snapping and husking rolls having their forward parts oppositely threaded at the same pitch for a like distance rearwardly with the rear ends of the threads offset, the rear parts of the opposed threads progressively changed in pitch to gradually lessen the width and the depth of their troughs, the rolls being rearwardly inclined to ride upwardly on alined stalks, the rear parts of the rolls having rubber covers secured thereon, and whereby at the region of the forward end parts of the covers and of the changing pitch of the threads, the stalks are gradually compressed therebetween, and when engaging the butt of an ear on a stalk, the yielding palmar grasp of the forward parts of the rubber covers against the husks terminally ruptures the stem of an ear within the husks while withdrawing the denuded husks downwardly between the rolls undetached from the stalk without uprooting the stalk and while expelling the ear from the husks.

HENRY J. KUHLMAN.